(12) United States Patent
Elshishiny et al.

(10) Patent No.: US 9,268,558 B2
(45) Date of Patent: Feb. 23, 2016

(54) SEARCHING SOURCE CODE

(71) Applicant: International Business Machines Corporation, Armonk, NY (US)

(72) Inventors: Hisham E. Elshishiny, Cairo (EG); Sherif Sabry, Cairo (EG); Ghada H. Selim, Giza (EG); Ossama Shokry, Giza (EG)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 14/033,624

(22) Filed: Sep. 23, 2013

(65) Prior Publication Data

US 2014/0089894 A1 Mar. 27, 2014

(30) Foreign Application Priority Data

Sep. 24, 2012 (GB) .................................. 1216976.9

(51) Int. Cl.
*G06F 9/44* (2006.01)
*G06F 9/45* (2006.01)

(52) U.S. Cl.
CPC .. *G06F 8/70* (2013.01); *G06F 8/42* (2013.01); *G06F 8/427* (2013.01); *G06F 8/75* (2013.01); *G06F 8/37* (2013.01)

(58) Field of Classification Search
None
See application file for complete search history.

(56) References Cited

U.S. PATENT DOCUMENTS

| | | | | |
|---|---|---|---|---|
| 5,790,863 A * | 8/1998 | Simonyi | ..................... | G06F 8/30 700/83 |
| 8,312,437 B2 * | 11/2012 | Villadsen | ..................... | 717/144 |
| 8,688,676 B2 * | 4/2014 | Rush | ..................... | G06F 8/36 707/706 |
| 8,875,110 B2 * | 10/2014 | Lee | ..................... | 717/142 |
| 2005/0166193 A1 * | 7/2005 | Smith | ..................... | G06F 8/75 717/143 |
| 2005/0262056 A1 | 11/2005 | Hamzy et al. | | |
| 2007/0169036 A1 * | 7/2007 | Garner | ..................... | G06F 8/437 717/143 |
| 2007/0244865 A1 * | 10/2007 | Gordon et al. | ..................... | 707/3 |
| 2007/0299825 A1 | 12/2007 | Rush et al. | | |
| 2008/0052670 A1 * | 2/2008 | Espinosa | ..................... | G06F 8/33 717/113 |

(Continued)

FOREIGN PATENT DOCUMENTS

| | | | |
|---|---|---|---|
| CN | 102063488 A | 5/2011 | |
| JP | 2010140407 A | 6/2010 | |

(Continued)

OTHER PUBLICATIONS

Keivanloo et al., "Semantic Webbased Source Code Search", 6th International Workshop on Semantic Web Enabled Software Engineering (SWESE 2010), San Francisco, USA., p. 1-16.*

(Continued)

*Primary Examiner* — Xi D Chen
*Assistant Examiner* — Zheng Wei
(74) *Attorney, Agent, or Firm* — Cantor Colburn LLP; Rahan Uddin

(57) ABSTRACT

Searching source code includes receiving a search string, a feature type and details of source code to be searched. The source code is parsed to generate an abstract syntax tree. The abstract syntax tree is indexed using a search structure defining all source code features for which searching is enabled. The search string is searched for the search string of the feature type in the indexed abstract syntax tree using a results structure defining the search outputs to be retrieved. A structured search result based on the output of the searching is provided. The structured search result is stored in the storage device.

12 Claims, 8 Drawing Sheets

(56) References Cited

U.S. PATENT DOCUMENTS

| | | | |
|---|---|---|---|
| 2009/0222799 A1* | 9/2009 | Stewart | G06F 8/72 717/143 |
| 2009/0293045 A1* | 11/2009 | Cheriton | G06F 8/51 717/136 |
| 2010/0037213 A1* | 2/2010 | Meijer | G06F 8/427 717/144 |
| 2010/0106705 A1 | 4/2010 | Rush et al. | |
| 2010/0153933 A1* | 6/2010 | Bohlmann et al. | 717/144 |
| 2010/0169871 A1* | 7/2010 | Villadsen | G06F 8/75 717/144 |
| 2010/0211929 A1* | 8/2010 | Naccache et al. | G06F 11/3664 717/113 |
| 2010/0269096 A1* | 10/2010 | Araya et al. | 717/113 |
| 2011/0302563 A1* | 12/2011 | Li | G06F 8/427 717/143 |
| 2011/0321020 A1* | 12/2011 | McCabe | G06F 8/41 717/144 |
| 2013/0159968 A1* | 6/2013 | Jazdzewski | G06F 8/43 717/114 |
| 2013/0185698 A1* | 7/2013 | Banerjee | G06F 8/75 717/114 |
| 2014/0359586 A1* | 12/2014 | Payette et al. | 717/140 |

FOREIGN PATENT DOCUMENTS

| | | |
|---|---|---|
| WO | 2007068527 A1 | 6/2007 |
| WO | 2007080142 A2 | 7/2007 |
| WO | 2008034170 A1 | 3/2008 |

OTHER PUBLICATIONS

Chilowicz et al., Syntax tree fingerprinting for source code similarity detection, published by IEEE, 2009, pp. 243-247.*

Neamtiu et al., Understanding Source Code Evolution Using Abstract Syntax Tree Matching, published by ACM, 2006, pp. 1-5.*

Kuhn et al., Abstract Syntax Tree, Published 2006: [retrieved on Mar. 7, 2015], Retrieved from Internet <http://www.eclipse.org/articles/Article-JavaCodeManipulation_AST>; pp. 1-8.*

Sager et al., Detecting Similar Java Classes Using Tree Algorithms, publised by ACM, 2006, pp. 65-71.*

Hsu et al., "A Multi-block Scheme for Searching Source Codes," IEEE, 2010, pp. 608-613.

Renuka Sindhgatta, "Using an Information Retrieval System to Retrieve Source Code Samples," Infosys Technologies Limited, ICSE 06, May 20-28, 2006, pp. 905-908.

* cited by examiner

SEARCHING SOURCE CODE

PRIORITY

This application claims priority to Great Britain Application No. 1216976.9, filed Sep. 24, 2012, and all the benefits accruing therefrom under 35 U.S.C. §119, the contents of which in its entirety are herein incorporated by reference.

BACKGROUND

The present invention relates generally to computer programming, and in particular, to searching source code stored on the storage device.

In an integrated development environment (IDE), a programmer needs to search for code artefacts such as definitions of functions or variables and references to functions or variables. The search may be needed because the programmer wants to check the implementation of the function or wants to rename the function. The traditional way to perform such a search is to use a plain text search. For instance, if a user needs to find the definition of a function called validateOfficialId( ) they would perform a text search in all source code files for the text "validateOfficialId", manually browse the search results and identify the implementation of the function and the various calls to the function. To go to a specific call to the function, the programmer needs to open the file that contains that call and then to show the piece of code that calls the function, the programmer needs to perform another text search within the opened file and needs to repeat the file search multiple times within the file to ensure that all occurrences of the function are covered within the file. Some editors do not show the line number/column number of the cursor and this makes the search even more difficult. Some text search capabilities in files just open the file that has the string that is searched for, without moving the cursor to that string in the file. This makes searching files even more difficult.

To overcome some of these difficulties associated with manual code searching, some editors provide a more advanced search capability in which the user can right-click on a code artefact (for example a function name) and choose from browse definition, which opens the definition of the artefact and find references, which opens a list of references to this artefact. There are at least three limitations to the search capability described above in that it is not available out of the box for some programming languages (or IDEs), even if the capability were available, it is not a customizable search capability that can meet the user's specific needs and requirements and coding is needed to support a new programming language.

Solutions, such as that described in U.S. Patent Publication No. 2010/0169871, entitled "Structured Search in Source Code", propose a solution to enhance searching source code. However, the focus of this type of solution is on natural language for searching the code without providing a pluggable, customizable search capability. Furthermore, new code is still required to support a new programming language.

SUMMARY

According to one embodiment of the present invention, there is provided a method for controlling a storage device for searching source code stored in the storage device. The method includes searching source code that includes receiving a search string, a feature type and details of source code to be searched. The source code is parsed to generate an abstract syntax tree. The abstract syntax tree is indexed using a search structure defining all source code features for which searching is enabled. The search string is searched for the search string of the feature type in the indexed abstract syntax tree using a results structure defining the search outputs to be retrieved. A structured search result based on the output of the searching is provided. The structured search result is stored in the storage device.

According to a second embodiment of the present invention, there is provided a system for searching source code. The system includes a user interface arranged to receive a search string, a feature type and details of source code to be searched. The system also includes a storage device arranged to store the source code therein, and a processor connected to the user interface and the storage device. The processor is configured to parse the source code to be searched to generate an abstract syntax tree. The abstract syntax tree is indexed using a search structure defining all source code features for which searching is enabled. The search string is searched for the search string of the feature type in the indexed abstract syntax tree using a results structure defining the search outputs to be retrieved. A structured search result based on the output of the searching is provided. The structured search result is stored in the storage device.

According to a third embodiment of the present invention, there is provided a computer program product for searching source code. The computer program product includes a computer readable storage medium having computer-readable program code embodied therewith, which when executed by a computer processor, causes the computer processor to implement a method. The method includes searching source code that includes receiving a search string, a feature type and details of source code to be searched. The source code is parsed to generate an abstract syntax tree. The abstract syntax tree is indexed using a search structure defining all source code features for which searching is enabled. The search string is searched for the search string of the feature type in the indexed abstract syntax tree using a results structure defining the search outputs to be retrieved. A structured search result based on the output of the searching is provided. The structured search result is stored in the storage device.

BRIEF DESCRIPTION OF THE SEVERAL VIEWS OF THE DRAWINGS

The subject matter regarded as the embodiments of the invention is particularly pointed out and distinctly claimed in the concluding portion of the specification. The embodiments, both as to organization and method of operation, together with objects, features, and advantages thereof, may best be understood by reference to the following detailed description when read with the accompanying drawings.

The embodiments of the present invention will now be described, by way of example only, with reference to the following drawings in which.

DETAILED DESCRIPTION

Embodiments are directed to controlling a storage device to search source code stored on the storage device. Embodiments provide a process that enables structured search capabilities for a new language, for example through an integrated development environment (IDE). The end user may be able to add a pluggable and customizable code search capability for any programming language to an IDE into a storage solution. Such a solution may provide a pluggable and customizable search capability that is made available to end users of the storage device without the need to add code for new programming languages. Advantages to this include that the code search capability is pluggable to existing IDEs, that it is customizable to the requirements and needs of the users, and that no code development is required to support a new programming language.

Embodiments may be implemented using a design time system and a runtime system. The design time system extends the IDE to support adding the search capability for a programming language, based on the grammar of the language, by using a new search model generator component that produces a search model. The runtime system uses the generated search model to enable the user to perform structured code search using a novel module capable of indexing the source code to make it efficiently searchable. When the user provides a search token (in the form of a string and a type), a novel search iterator module consults the indexed code looking for the token and presents the results in the structure defined by the user.

In the design time system, a parser may be generated from the received grammar for parsing source code of the programming language. The received grammar for the programming language plus the received user input defining search criteria may be used in the design time system to generate the search structure and the results structure. A search user interface may also be generated from the received grammar and the received user input.

Figure 1:
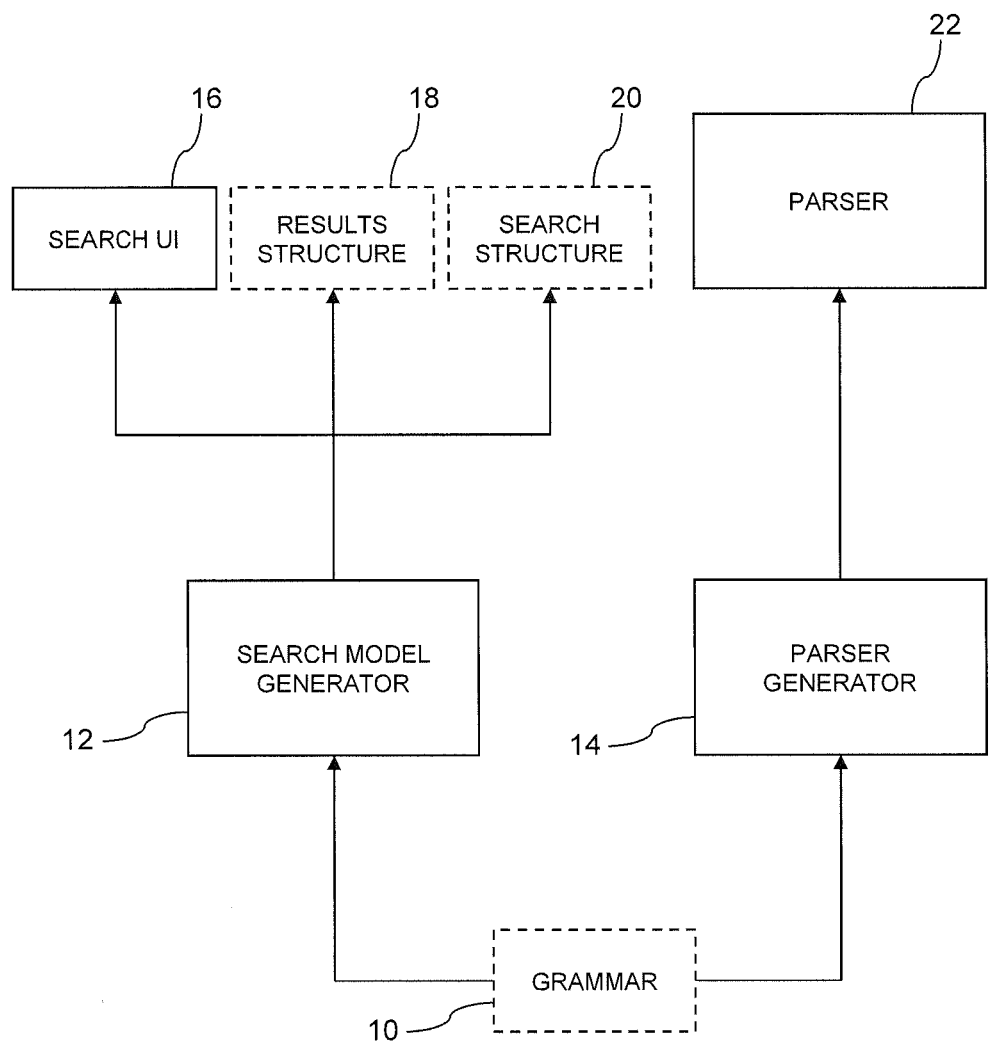
FIG. 1 is a schematic diagram of a design time system in accordance with an embodiment.

An embodiment of an arrangement for providing the pluggable code search capability comprises two systems, a design time system and a runtime system. FIG. 1 shows an embodiment of the design time system as a block diagram. The design time system may include a number of modules (shown in solid lines) and a number of data structures (shown in dotted lines). In order to support a new programming language in an IDE, the design time system is used and is only run once per programming language. The design time system shown in FIG. 1 is appropriate for any existing computer programming language and for programming languages that may be developed in the future. As long as a defined grammar 10 is available for the programming language, then the design time system of FIG. 1 can be utilized.

The design time system shown in FIG. 1 includes a parser generator 14 that is used to generate a parser 22 for the language, based on the language grammar 10. The parser generator 14 can receive the programming language grammar 10 as an input, and then parse the grammar 10 and generate code for a parser 22 specific to that language. The parser 22 can be generated in such a way that when the parser 22 receives source code written in the programming language, the parser 22 will produce an abstract syntax tree (AST) for the source code, which is described in more detail below with reference to FIG. 3.

The design time system can also include a search model generator 12 that provides the user with a user interface for selecting the search structure 20 and the results structure 18. The search model generator 12 reflects the features of the language as defined by the grammar 10 and also generates a search user interface 16 that corresponds to the search structure 20 and the results structure 18. The search model generator 12 can have its own user interface, through which the user will make choices that determine the results structure 18 and the search structure 20.

The search model generator 12 can receive the programming language grammar 10 as an input, and then parse the grammar 10 and present the end user with a list of programming language features. This list comes from the grammar 10 and includes artefacts specific to the programming language (for example, class, variable, method, for loop and/or block etc.). The user interface of this component enables the user to select the subset of the programming language features that they wish to enable the search for them (for example, class, variable and/or function). This becomes the search structure 20. Another feature of the user interface of this component is that the user interface can show the possible search results (for example, definition, reference and/or number of occurrences). The end user can select a subset of this list, and this becomes the results structure 18. The list of possible search results is programming language independent.

Figure 2:
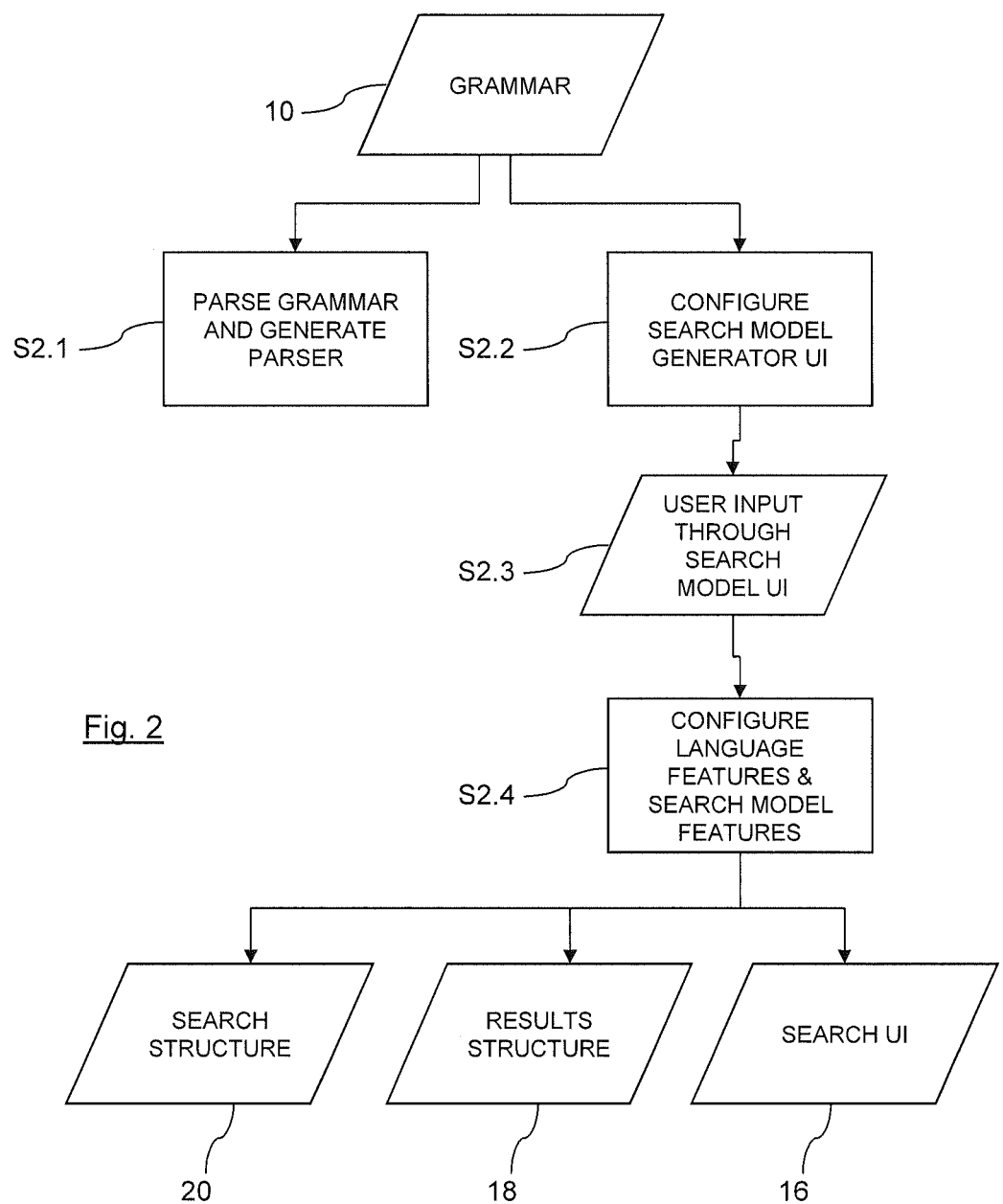
FIG. 2 is a flowchart of a method of operating the design time system in accordance with an embodiment.

The blocks describing an embodiment of the method for the design time are shown in FIG. 2. At block S2.1, the language grammar 10 is fed to the parser generator 14 in order to produce a parser 22 specific to the programming language being used. At block S2.2, the language grammar 10 is also fed to the search model generator 12, in order to configure its user interface to show the programming language features (for example, classes, functions, variables, blocks and for loops etc.). At block S2.3, the end user accesses the user interface of the search model generator 12 to select two things: first the language features that they would like to enable the search for, such as classes, functions and/or variables for example; and second the structure of the search results that they would like to retrieve, for example definition, reference and/or number of occurrences.

At block S2.4, based on the user selections three outcomes can be produced: first a search structure 20 which is the list of all language features that the user would like to enable the search for (such as class, function and/or variable); second a results structure 18, which is a list of search results that the user would like to retrieve after performing the search (such as definition, reference and/or number of occurrences); and third a search user interface 16, which is a user interface page that the end user will use to input the search token when they are actually performing a search in an IDE. For example, the user can specify that they are searching for a function, by selecting a radio button in the user interface and the name of the function by typing search string in an edit box. This user interface page conforms to the generated search structure 20 and the results structure 18.

Figure 3:
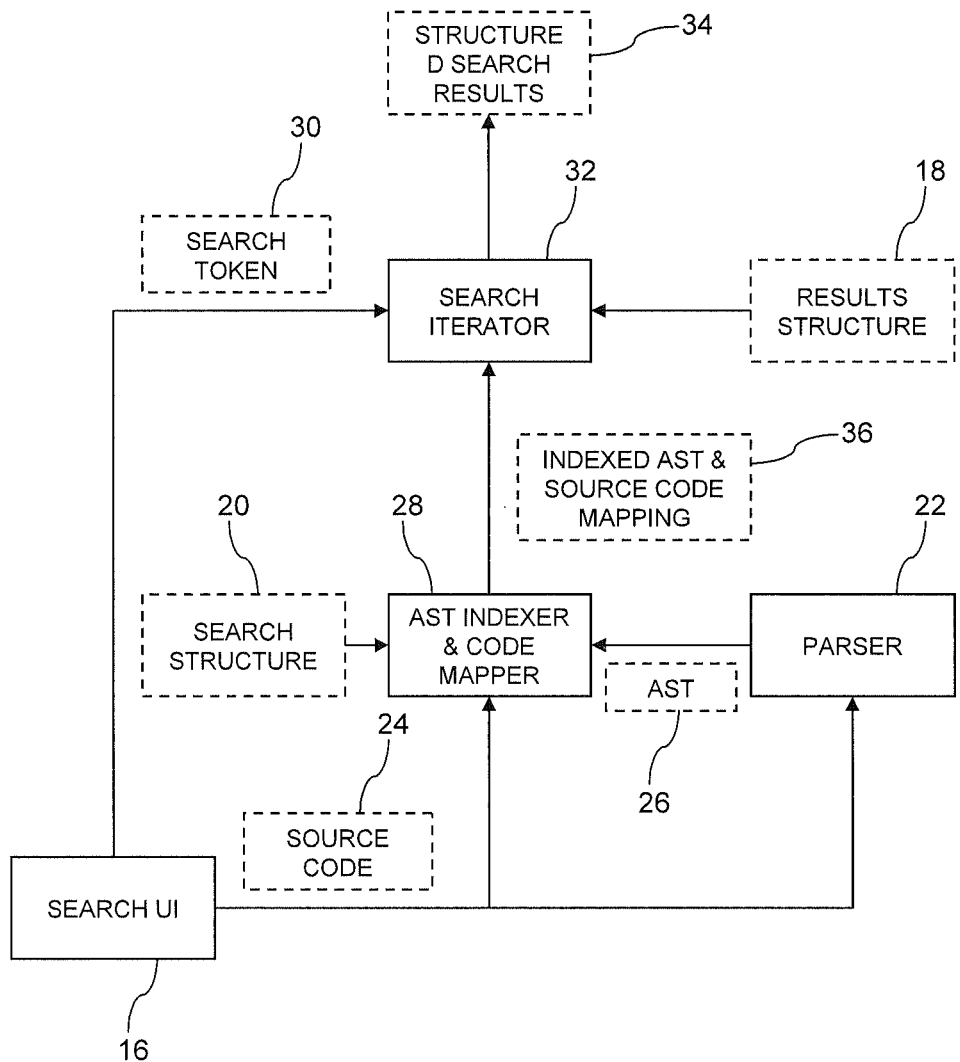
FIG. 3 is a schematic diagram of a runtime system in accordance with an embodiment.

Once the design time system has been implemented for the programming language, the search capability is now available in an IDE for this language. The user can now use this capability to perform search in any available source code. Since the system that the user uses to perform the actual code search is invoked multiple times for any source code file, it is referred to as the runtime system. FIG. 3 shows a block diagram of an embodiment the runtime system. The following parts of the runtime system are generated once per programming language in the design time system, and then used in the runtime system: the parser 22, the search user interface 16, the search structure 20 and the results structure 18.

The runtime system shown in FIG. 3 includes the search user interface 16, which is used to input a search token 30 in the form of a string and a type (for example, the user may request a search for "validateInput" of type Function) and to select the source code 24 files in which to search. The runtime system also includes the parser 22 that produces an AST 26 corresponding to the input source code 24, a module called the AST indexer/code mapper 28 that takes as inputs the AST 26, the search structure 20, and the source code 24 to produce a "search-optimized" indexed AST and source code mapping 36. The runtime system can also include the search iterator 32 that uses the indexed AST and source code mapping 36 to find parts of the AST 26 that include the search token 30 and transforms these parts into a structured search result 34 according to the results structure 18.

Figure 4:
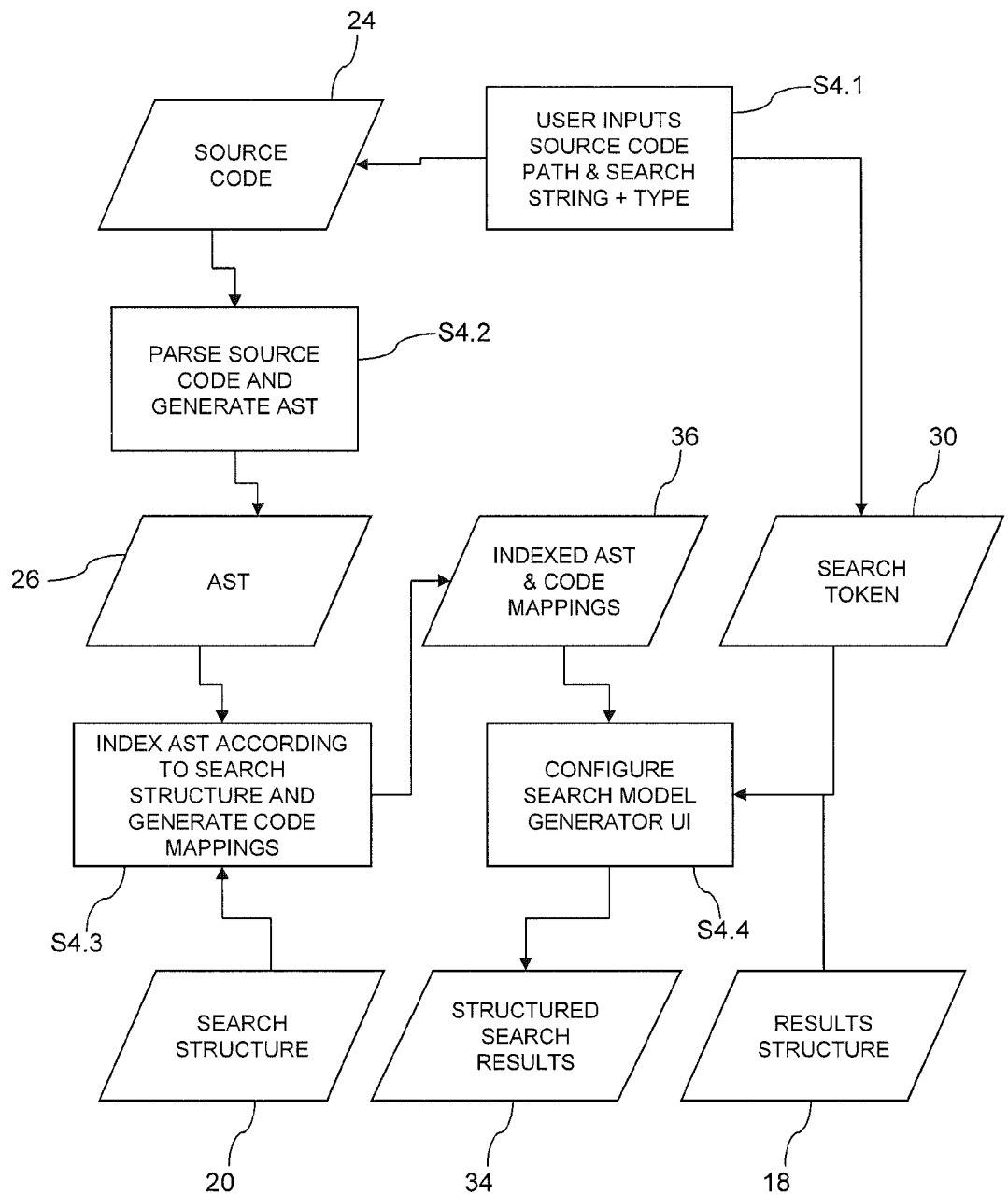
FIG. 4 is a flowchart of a method of operating the runtime system in accordance with an embodiment.

The blocks describing an embodiment of a method for the runtime system are shown in FIG. 4. At block S4.1, the user accesses the search user interface 16 to input the search token 30, which is a name and type pair, for example name="validateData" and type=function. The user can also use the search user interface 16 to select the source code 24 files. At block S4.2, the source code 24 is fed to the parser 22 in order to generate the AST 26.

At block S4.3, the AST indexer and code mapper 28 can take the AST 26 and the source code 24 and creates an indexed version of the AST 26, called the indexed AST and source code mapping 36. The indexed AST and source code mapping 36 is indexed based on the contents of the search structure 20. For each entry in the search structure 20, there will be an index where the key is the value of this entry and the value is a list of all AST 26 parts that include this value. For instance, if the search structure 20 contained three values: "class", "function", and "variable", then the indexed AST and source code mapping 36 will have three indexes, one for each of these artefacts. The index for "function", for example, would have key/value pairs where the key is the function name and the value is a list of parts of the AST 26 that include this function. The generated indexed AST and source code mapping 36 contains a mapping to the source code 24 that is being searched. Thus, the value part in the indexes will have a reference to the corresponding source code 24 files, in the form of file name and line number.

At block S4.4, the search iterator 32 uses the search token 30 to get the needed parts from the indexed AST and source code mapping 36 and produces the structured search result 34 according to the results structure 18. For instance, if the results structure 18 contained two values "definition" and "reference", then the structured search result 34 will have these two categories.

Figure 5:
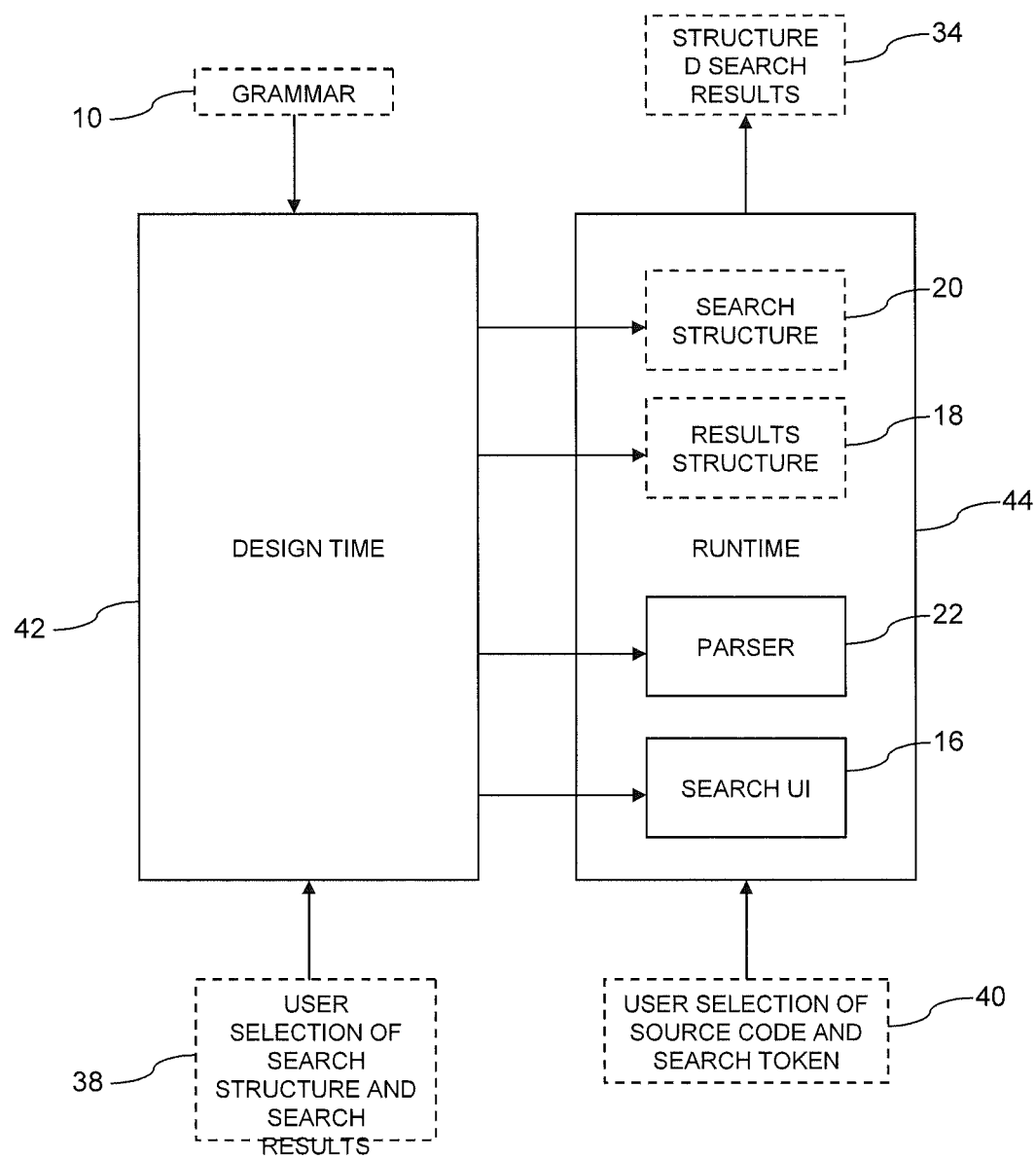
FIG. 5 is a schematic diagram of the design time system and runtime system in accordance with an embodiment.

FIG. 5 shows an embodiment of the relationship between the design time system 42 and the runtime system 44. The runtime system 44 uses the four artefacts: the search structure 20, the results structure 18, the parser 22 and the search user interface (UI) 16 produced by the design time system 42, in addition to its own artefacts, to produce the structured search result 34 for the user. The user input to the runtime system 44 is the user selection 40 of source code 24 and search token 30. The design time system 42 is run once only per programming language and creates the components that are used to make a plug-in for use with any IDE. The runtime system 44, which is essentially embodied by the plug-in is run once per search by the user, who accesses the plug-in via the normal user interface of the IDE.

When the design time system 42 is run for a new (or existing) programming language, the user can customise the resulting output via the user selection 38 of the search structure and search results, which takes place in the user interface of the search model generator 12. The user choices made in this user interface guide the creation of the search user interface 16, the results structure 18 and the search structure 20, which are based upon the grammar 10 of the specific programming language. When the runtime system 44 is executed, then the structured search results 34 are generated using these elements and also the parser 22 that is generated by the design time system 42. The structured search result 34 is produced by the runtime system 44 in response to the user selection 40 of source code 24 and search token 30.

The following example illustrates an exemplary embodiment of steps for creating a pluggable code search capability for the LANGUAGE1 programming language. In this example, the user would like to enable a code search capability for the LANGUAGE1 programming language. A single run of the design time system is required as follows. First, the user provides the grammar 10 of the LANGUAGE1 programming language. The parser generator 14 generates a parser 22 for the LANGUAGE1 programming language based on the grammar 10 of the LANGUAGE1 programming language.

Figure 6:
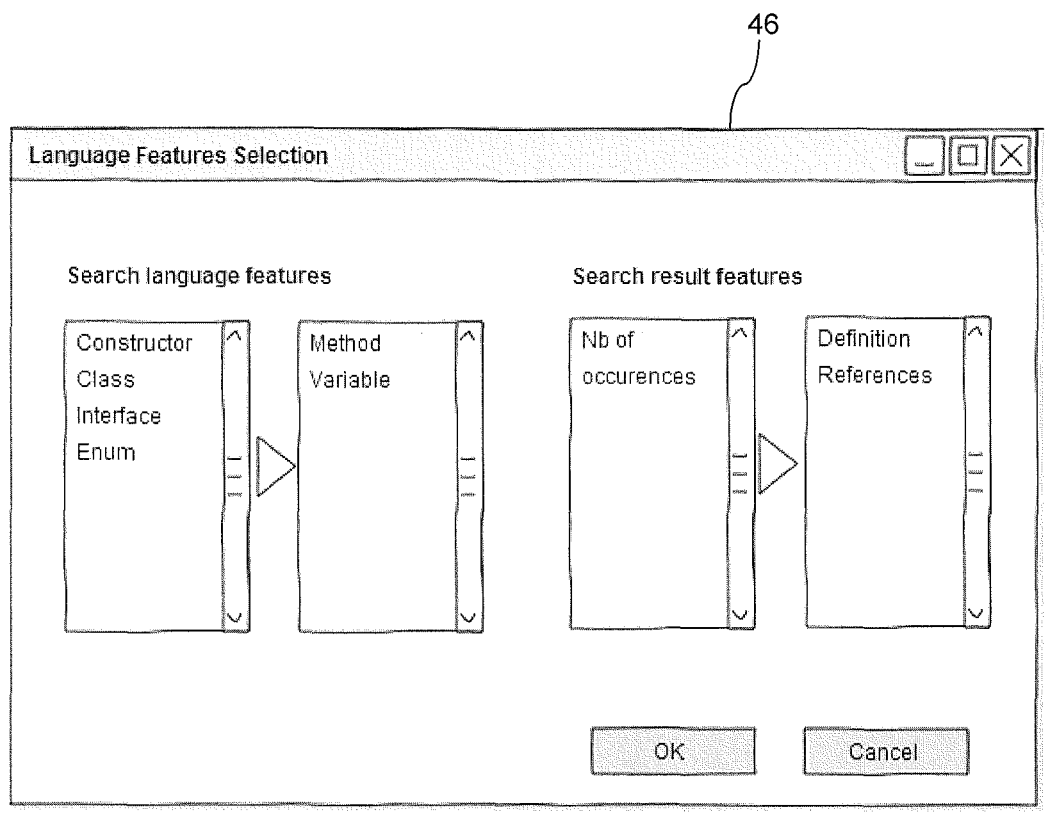
FIG. 6 is a screenshot of a user interface to the design time system in accordance with an embodiment.

The search model generator 12 configures its user interface 46 to show the language features of the LANGUAGE1 programming language, which in an embodiment are Constructor, Class, Interface, Enum, Method and Variable, as shown in FIG. 6. The user chooses a subset of the language features, in this example, only Method and Variable. The user interface 46 of the search model generator 12 also shows a list of possible search results which are Definition, Reference and Number of occurrences. The user selects a subset of the search results, in this case, only the definition and reference features.

The search model generator 12 then generates three artefacts, first a search structure 20: a list containing {Method, Variable}, second a results structure 18: a list containing {definition, reference}, and third a specific search user interface 16 page that contains an edit box for the user to input the search string and a set of radio buttons that correspond to the contents of the search structure 20. Further, the search user interface 16 can contain a set of check boxes that correspond to the contents of the results structure 18. Now an IDE has been extended to provide structured code search capability for the LANGUAGE1 programming language.

Given that the code search capability has been enabled for the LANGUAGE1 programming language, as detailed above, the user would like to search for a LANGUAGE1 function called "validateName". A single run of the runtime system specific to the LANGUAGE1 programming language is performed as follows. First, the user selects the LANGUAGE1 source code files to search in. The source code 24 files are fed to the LANGUAGE1 specific parser 22 in order to produce an AST 26. The AST indexer and code mapper 28 uses the AST 26 and the source code 24 to fill an indexed AST and source code mapping 36, according to the search structure 20. The indexed AST and source code mapping 36 contains two indexes: one for each of the search structure 20 contents {Method, Variable}. For instance, a sample entry in the index for Method might be key: method name="validateName" and value: parts from the AST 26 that contain this method, with the mapping to the corresponding source file and line number.

Figure 7:
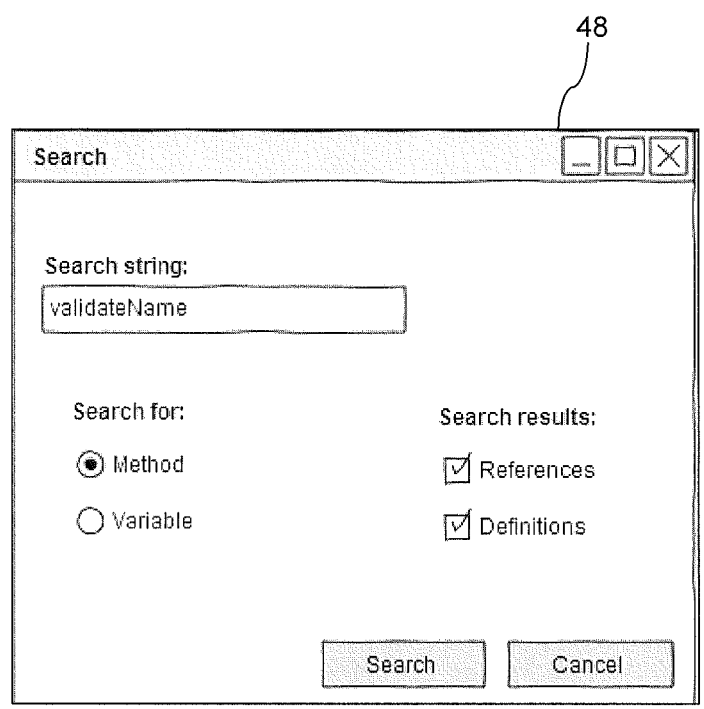
FIG. 7 is a screenshot of a user interface to the runtime system in accordance with an embodiment.

The user searches for a method definition and references by opening the search user interface 16 for the LANGUAGE1 programming language. The user inputs "validateName" in the search for edit box, as illustrated in FIG. 7, which shows the user interface 48 to the search user interface 16. The user selects the method radio button to instruct the system to search for methods and the user selects both the definition and the reference check boxes. The user presses SEARCH and the search user interface 16 produces a search token 30 with value="validateName" and type=method.

An embodiment of the search iterator 32 generates the structured search result 34 as follows. Since the type of this particular search token 30 is a method, the search iterator 32 consults the Method index of the indexed AST and source code mapping 36. The search iterator 32 gives method index the string "validateName" and retrieves the parts from the AST 26 that contain this method, with the mapping to the corresponding source file and line number. Since the results structure 18 includes a list containing {definition, reference}, the search iterator 32 creates two lists, one for method definitions, and the other for method references. The search iterator 32 puts the definition of the method "validateName" in the Method definition list, and puts all the references to that method in the Method references list. The two lists filled in this way become the structured search result 34.

Figure 8:
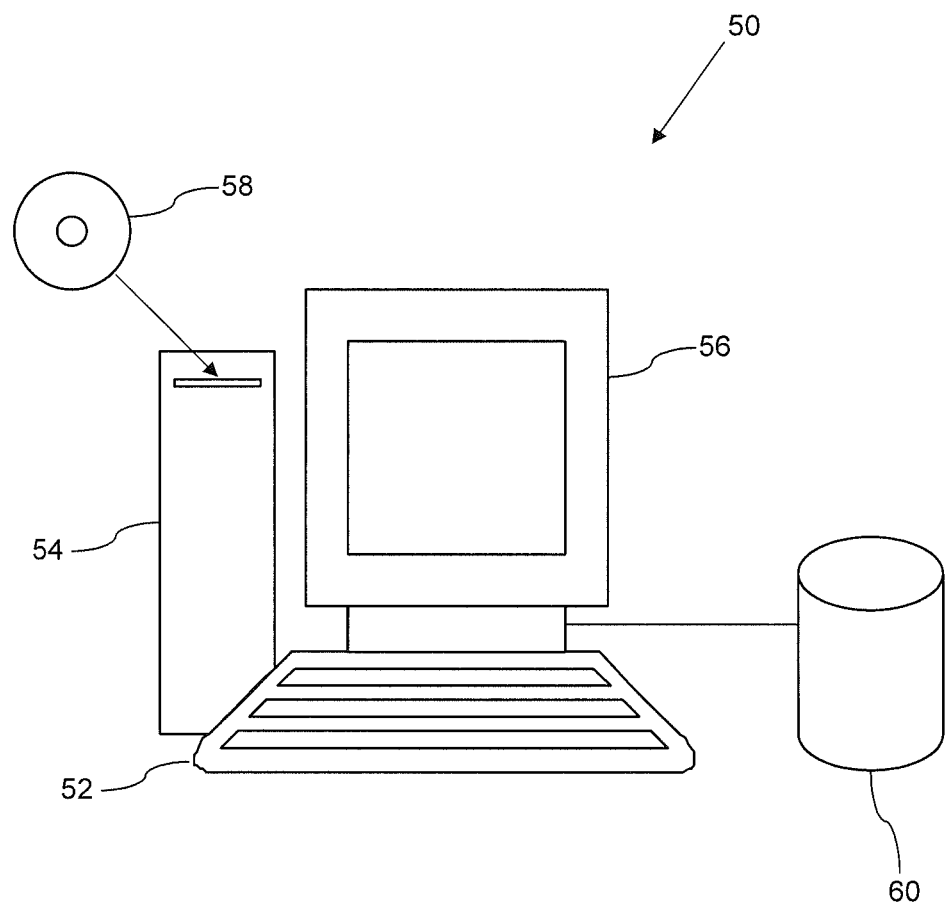
FIG. 8 is a schematic diagram of a data processing system in accordance with an embodiment.

FIG. 8 shows an example of a data processing system 50 that can be used to create the plug-in that will be used to provide the search facility. The data processing system 50 can also be used to run an IDE that will have the self-contained plug-in installed therein, in order that the user can take advantage of the search facility. The data processing system 50 includes a user interface 52 (a keyboard), a processor 54 and a display device 56. In relation to the operation of the data processing system, a computer readable medium 58 (a CD-ROM) is provided, which has a computer program product stored thereon. The instructions of the computer program product are loaded onto the processor 54 and are used to control the processor 54.

A storage device 60 stores the source code 24 that is being searched. The storage device 60 could be part of the data processing system 50, but is most likely to be located remotely from the data processing system 50 as part of an enterprise storage solution. The data processing system 50 connects to the storage device 60 over a suitable communication network. The processor 54 controls the storage device 60 is order to perform the searching of the source code 24 that is stored therein. The operation of the storage device 60 is therefore changed from its normal operation in order to implement the code searching facility described herein.

The two separate parts of the process, the design time system (which is run once only) and the runtime system (which is run every time a search is made in the IDE) can both be run from the data processing system 50, shown in FIG. 8. Assuming that a suitable plug-in for the user's IDE does not already exist, the user can access the design time system and create the components of the plug-in, as described above, with reference to FIGS. 1 and 2. Once the plug-in has been created, the user's IDE can be configured to install the plug-in and the user can then access the runtime system every time that they wish to make a search of any source code to which they have access.

The invention claimed is:

1. A method for controlling a storage device for searching source code stored in the storage device, the method comprising:
   receiving a search string, a feature type and details of source code to be searched;
   parsing the source code to be searched to generate an abstract syntax tree;
   indexing the abstract syntax tree using a search structure defining all source code features for which searching is enabled, wherein the source code features for which searching is enabled are defined during an initialization process that includes generating a parser based on a grammar of a programming language of the source code, the parser for parsing the source code, and the source code features for which searching is enabled including only a selected subset of source code features associated with the programming language;
   searching for the search string of the feature type in the indexed abstract syntax tree using an index corresponding to the feature type and a results structure defining the search outputs to be retrieved;
   providing a structured search result based on the output of the searching; and
   storing the structured search result in the storage device.

2. The method of claim 1, further comprising creating a self-contained plug-in from the parser, the search structure, the results structure and the search user interface.

3. The method of claim 1, further comprising receiving a grammar for the programming language, receiving user input defining search criteria and generating the search structure and the results structure from the received grammar and the received user input.

4. The method of claim 3, further comprising generating a search user interface from the received grammar and the received user input, the search user interface for receiving the search string, the feature type and the details of source code to be searched.

5. A system for searching source code, the system comprising:
   a user interface arranged to receive a search string, a feature type and details of source code to be searched,
   a storage device arranged to store the source code therein, and
   a processor connected to the user interface and the storage device, the processor configured to:
   parse the source code to be searched to generate an abstract syntax tree;
   index the abstract syntax tree using a search structure defining all source code features for which searching is enabled, wherein the source code features for which searching is enabled are defined during an initialization process that includes generating a parser based on a grammar of a programming language of the source code, the parser for parsing the source code, and the source code features for which searching is enabled including only a selected subset of source code features associated with the programming language;
   search for the search string of the feature type in the indexed abstract syntax tree using an index corresponding to the feature type and a results structure defining the search outputs to be retrieved;
   provide a structured search result based on the output of the search; and
   store the structured search result in the storage device.

6. The system of claim 5, wherein the processor is further configured to create a self-contained plug-in from the parser, the search structure, the results structure and the search user interface.

7. The system of claim 5, wherein the processor is further configured to receive a grammar for the programming language, receive user input defining search criteria and generate the search structure and the results structure from the received grammar and the received user input.

8. The system of claim 7, wherein the processor is further configured to generate a search user interface from the received grammar and the received user input, the search user interface for receiving the search string, the feature type and the details of source code to be searched.

9. A computer program product for searching source code, the computer program product comprising a non-transitory computer readable medium having computer-readable program code embodied therewith, which when executed by a computer processor, causes the computer processor to implement:

receiving a search string, a feature type and details of source code to be searched;

parsing the source code to be searched to generate an abstract syntax tree;

indexing the abstract syntax tree using a search structure defining all source code features for which searching is enabled, wherein the source code features for which searching is enabled are defined during an initialization process that includes generating a parser based on a grammar of a programming language of the source code, the parser for parsing the source code, and the source code features for which searching is enabled including only a selected subset of source code features associated with the programming language;

searching for the search string of the feature type in the indexed abstract syntax tree using an index corresponding to the feature type and a results structure defining the search outputs to be retrieved;

providing a structured search result based on the output of the searching; and storing the structured search result in the storage device.

10. The computer program product of claim 9, wherein the computer processor further implements creating a self-contained plug-in from the parser, the search structure, the results structure and the search user interface.

11. The computer program product of claim 9, wherein the computer processor further implements receiving the grammar for the programming language, receiving user input defining search criteria and generating the search structure and the results structure from the received grammar and the received user input.

12. The computer program product of claim 11, wherein the computer processor further implements generating a search user interface from the received grammar and the received user input, the search user interface for receiving the search string, the feature type and the details of source code to be searched.

* * * * *